United States Patent Office 3,404,067
Patented Oct. 1, 1968

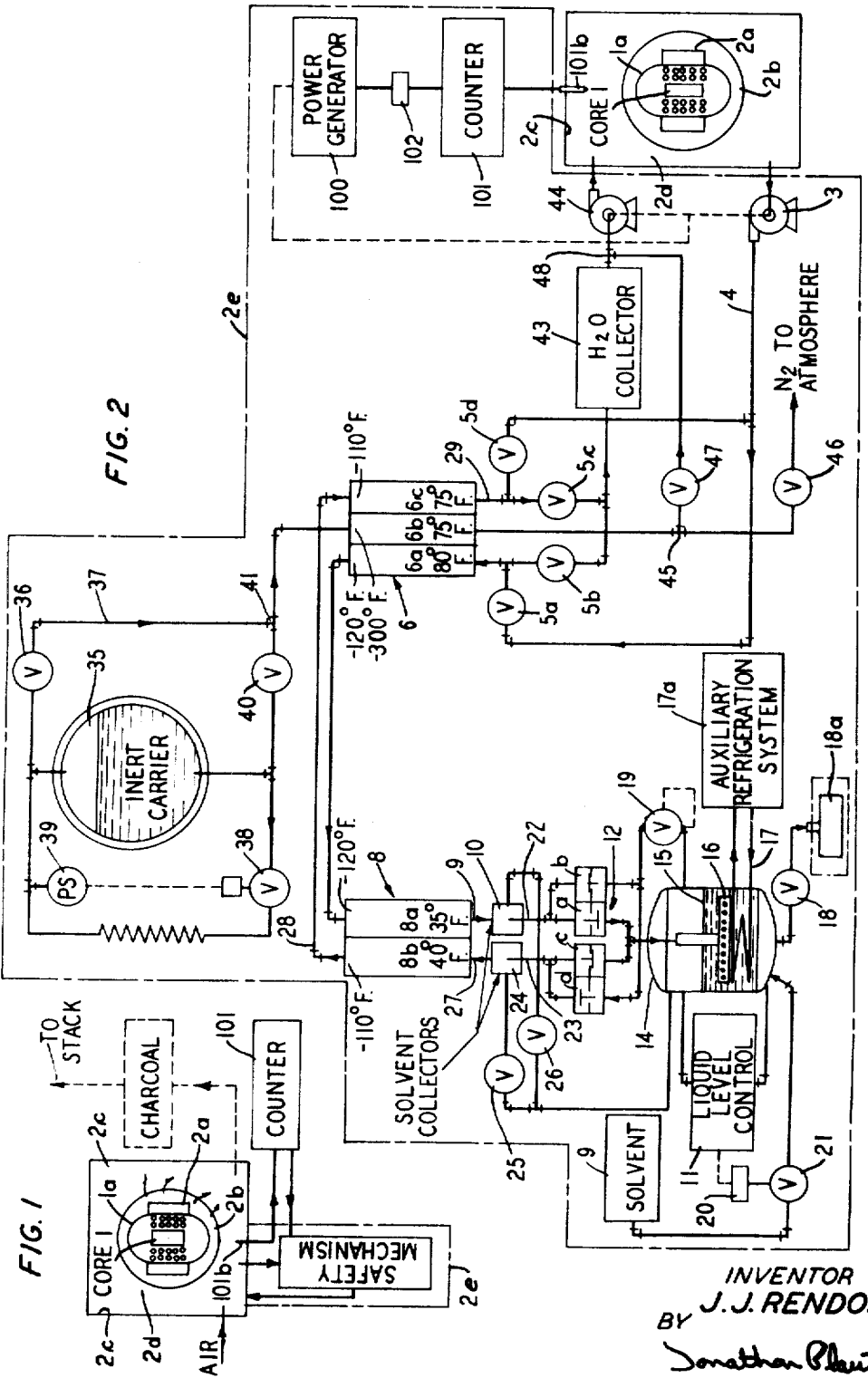

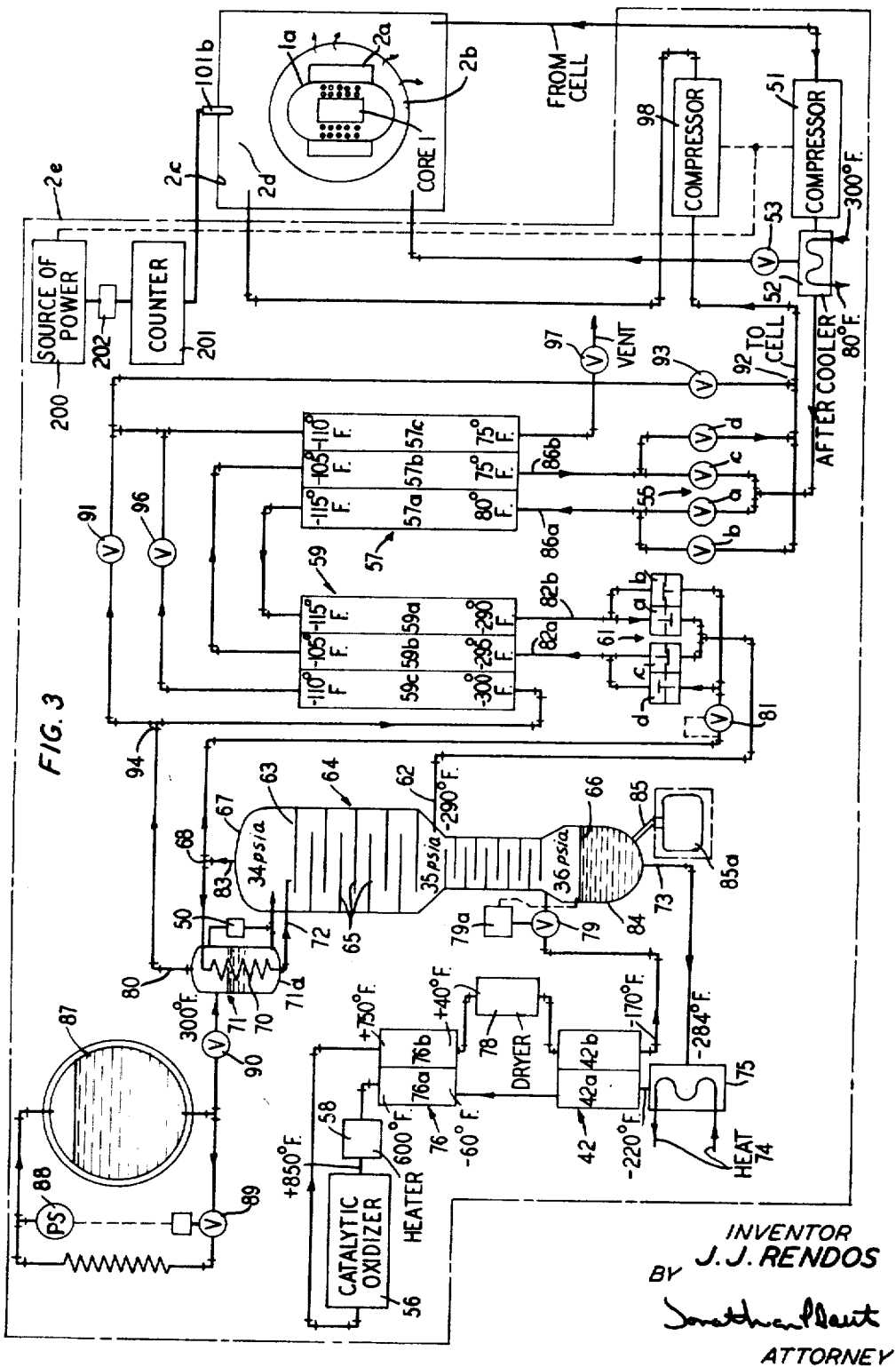

3,404,067
PROCESS FOR REMOVING RADIOACTIVE
MATERIALS FROM THE ENVIRONMENT
OF AN ATOMIC REACTOR
John J. Rendos, Millington, N.J., assignor to Air Reduction Company, Incorporated, New York, N.Y., a corporation of New York
Filed Feb. 12, 1965, Ser. No. 432,289
17 Claims. (Cl. 176—37)

This invention relates in general to techniques and apparatus for increasing the operational safety of nuclear reactors, and more particularly, where such reactors serve as generators in nuclear powered ships.

In accordance with present practice, the containment shell which houses the nuclear reactor designed to generate power in a vessel, such as the NS *Savannah*, is enclosed in a shielded housing in which air is continuously circulated to remove any fissionable products which may leak through the shielding of the reactor. Before the air exhausted from the housing is admitted to the atmosphere, it is passed over a silver catalyst to remove the fission products of iodine, including the noble gases, xenon and krypton, which in their radioactive states are highly poisonous in the atmosphere. These are adsorbed on charcoal and contained for a sufficient time to reduce their activity. Whereas such a system suffices to take care of minor leaks, it is totally inadequate to cope with larger malfunctions which may be caused, for example, by a crash or explosion of the nuclear powered vessel.

Accordingly, it is the general object of the present invention to improve the safety of operation of nuclear reactors, and more particularly, where such reactors are employed as the propulsion means for ships, in a manner which is efficient and adequate.

These and other objects are realized in several arrangements in accordance with the present invention. As in the prior art system, the shielded reactor in each case is enclosed in a shielded outer chamber or housing. The latter communicates with an auxiliary shielded chamber containing means designed, in the event of leakage of large concentrations of radioactive contaminants from the reactor core into the outer chamber, to flood the outer chamber with nitrogen, or similar inert carrier gas, in a circulating stream which entrains the radioactive fission products, such as xenon and krypton, escaping from the core. The auxiliary chamber contains a closed conduit system into which is forced the stream of inert carrier gas bearing xenon and krypton or other fission products. The closed circuit includes some means of absorbing or separating the radioactive products from the inert carrier gas stream for eventual safe disposal, such as recovery in usable form or off-shore dumping.

In one embodiment of the invention, a stream of nitrogen, preferred as the carrier gas, which contains the radioactive contaminants, is first passed through a heat exchanger to freeze out water and other higher freezing impurities; and is ultimately introduced into a bath of solvent having a high affinity for xenon and krypton. This may comprise, for one example, trichlorofluoromethane, $CCl_3F$, manufactured under the trade name "Freon 11," which absorbs the radioactive gases xenon and krypton from the nitrogen stream, the latter being returned through the cycle for re-use. However, other alternative solvents may be used for this purpose, as will be discussed in detail hereinafter. Batches of solvent containing the radioactive contaminants are processed for recovery of the latter, or alternatively, are committed to containers for disposal at sea or elsewhere.

In another embodiment, the nitrogen carrier stream, after water and other impurities have been frozen out, is passed into a separation column where the krypton and xenon an dother impurities are removed from the nitrogen by a stripping process. The radioactive xenon and krypton are removed from the bottom of the column for further processing or disposal, and the purified nitrogen is returned through the cycle for re-use, as in the other embodiment.

Other objects, features, and advantages of the invention will be apparent to those skilled in the art after a study of the detailed specification and claims hereinafter with reference to the attached drawings, in which:

FIGURE 1 is a block diagram showing the housing arrangement of the safety mechanism of the present invention with reference to the inner core and outer housing of a nuclear reactor which serves as the power generator;

FIGURE 2 is a schematic drawing of the details of one embodiment of the invention in which the radioactive contaminants are collected from the nitrogen stream in a solvent bath; and FIGURE 3 is a schematic drawing of the details of an alternative embodiment of the invention in which the radioactive contaminants are removed from the nitrogen stream in a separation column.

Referring to FIGURE 1 of the drawings, 1 represents the core of a nuclear reactor, which in the present illustrative embodiment may comprise, for example, bundles of rods of enriched uranium oxide. The fuel elements are arranged in a cruciform prism, juxtaposed with control rods of boron stainless steel clad in stainless steel.

The core 1 furnishes power for the operation of a nuclear powered vessel, such as the NS *Savannah*. The nuclear reaction in the core 1, which in the present illustrative example has a maximum fuel temperature of 3794° F., is cooled and controlled by water flowing through at a pressure of 1750 pounds per square inch absolute, and a mass flow of $8 \times 10^6$ pounds per hour, in three vertical passes, having an inlet temperature of 495.6° F., a maximum temperature of 541° F., and an outlet temperature of 520.4° F. The water thus circulated under high pressure removes and utilizes the tremendous heat generated by the atomic fission within the core. The closed circuit in which the water flows includes a pair of heat exchangers in which it furnishes the heat to generate steam for driving a pair of steam turbines which power the ship.

Particular dimensions will be included in the following description. It is of course understood that such dimensions are included for illustrative purposes and do not limit the scope of invention.

The core 1, including the circulating water coolant, is enclosed in a reactor shell 1a, which is a vessel clad internally with stainless steel, for example 26 feet 6 inches high, having an inside diameter of 8 feet 2 inches, and a thickness of 6 inches, and designed to withstand an internal pressure of 2000 pounds per square inch. This is surrounded by a lead covered neutron shield tank 2a, for example 17 feet high, which shields the reactor with an annular thickness of 33 inches of water and 2 to 4 inches of lead. A containment vessel 2b comprising a steel cylinder, for example 35 feet in diameter with hemispherical ends and an overall length of 50 feet, and having a thickness which varies from 2⅜ inches to 4 inches, encloses the nuclear reactor and all of the radioactive components, including the cooling system, and heat exchangers. The secondary shielding 2c which forms chamber 2d outside of the containment shell 2b is in this illustration, a composite arrangement of polyethylene up to 6 inches thick, lead, ordinary and barytes concrete, water tanks and a collision mat of alternate layers of redwood and steel.

Under ordinary circumstances, as pointed out in the introduction, air is circulated through the chamber 2d, formed by the secondary shielding. Before this air is released to the atmosphere through a vent in the ship's superstructure, it is passed over charcoal and a silver catalyst to remove the fission products.

However, if the concentration of radioactive contaminants including xenon and krypton in the air circulating through the chamber 2d exceeds the safe limit, as defined by standards set forth by the Atomic Energy Commission, through the occurrence of what will be called a maximum credible accident, the treatment previously described would be inadequate to prevent contamination of the outer atmosphere. In such event, the safety system in accordance with the present invention would be triggered into operation by a detecting means 101, which may take the form, for example, of a conventional counter having a probe 101b disposed in contact with the air circulating in chamber 2d.

The safety system in accordance with the present invention is enclosed in an auxiliary chamber 2e, for example 7 feet by 7 feet in cross-section and 12 feet deep, comprising half-inch steel plate, which is externally shielded with lead shielding, polyethylene shielding, and concrete shielding, applied in overlapping layers of similar thicknesses to the secondary shielding 2c, of the nuclear reactor system, and designed so as to be substantially impervious to gamma radiation, alpha particles, and other radiation emitted by the decaying radioactive contaminants. Chamber 2e is disposed in contiguous relation with a portion of the wall of chamber 2d, communicating with the latter through a closed conduit system.

When the generator 100 of the safety system of the present invention is triggered into operation by a massive accident or malfunction in the reactor, causing the release of a large quantity of radioactive contaminants including radioactive xenon and krypton into the outer chamber 2d, a stream of nitrogen, or similar inert gas, is caused to circulate in the chamber 2d at the rate of say 200 standard cubic feet per minute, to remove fission products leaking out of the steel containment shell 2b. The radioactive contaminants, together with steam leaking out of the high pressure water cooling system of the reactor, are withdrawn or flushed out of chamber 2d under pressure, and into the closed system of conduits housed in the auxiliary chamber 2e, thus preventing possible pollution of the atmosphere.

In the present illustrative embodiment, nitrogen has been chosen as the preferred inert carrier gas for the following reasons. In addition to being inert chemically, its isotopes which are produced by the fission process have relatively short half-lives, and produce no appreciable gamma radiation. Moreover, nitrogen is many times cheaper to produce and store than other inert gases, such as argon, helium and neon, which, while otherwise suitable, are not economically feasible for the purposes of the present invention. Furthermore, the fission products including xenon and krypton, after being carried away from the outer chamber 2d of the reactor, readily condense from the nitrogen stream so that the latter can be reused.

Referring now to FIGURE 2 of the drawings which shows details of one embodiment of the present invention, liquid nitrogen, which is commercially available at 99.9995 mole percent purity for the purposes of the present invention, is supplied from the storage tank 35, which in the present illustrative embodiment is large enough to hold at least 200 gallons. This will provide a recirculation flow rate of 200 standard cubic feet per minute for about 12 hours, which is more than sufficient to cool and process the radioactive gases which would be released in the case of a maximum credible accident in the illustrative embodiment. Tank 35 is of double vessel construction, and suitably insulated for cryogenic service with powdered insulation, such as a porous light-weight silica gel, from which water has been removed, manufactured under the trade name "Santocel," or alternatively, with perlite, a form of glassy rock similar to obsidian. The inner vessel operates at a pressure of about 50 pounds per square inch absolute, and a temperature of —300° F., or lower, depending on the subcooling of the liquid nitrogen.

The pressure switch 39 operates to control the pressure in the inner vessel of the storage tank 35. The pressure signal generated in tank 35 is directed to valve 38 at the bottom of the tank. A tripping device in this valve is set to operate at a preselected pressure. When the pressure reaches the requisite value, the pressure signal sensing system actuates a miniature electrical switch. This cuts off the power supply, closing the solenoid valve 38.

Conversely, at low operating pressures, the pressure signal actuates the electrical switch to supply power to reopen the solenoid valve 38. Alternatively, this system can be operated pneumatically, utilizing an instrument air supply. In such case, the solenoid valve 38 is replaced by a diaphragm motor-operated valve.

Liquid nitrogen, derived from the bottom of the double-walled tank 35 at about —300° F. through the valve 40, and nitrogen vapor, derived from the top of tank 35 through valve 36, can be mixed together at the junction point 41 or can be admitted separately as required. When a large refrigeration load is required, the latent and sensible heat in the liquid nitrogen can be utilized by the use of valve 40. When gas only is required as make up, valve 36 is employed. Each of the aforesaid valves is a standard cryogenic type. These valves may be operated manually, or by conventional pneumatic or electrical means.

In the present embodiment, the rate of flow from junction 41 is 20 standard cubic feet per minute, and the pressure is maintained at 30 pounds per square inch absolute. This assumes that the rate of flow in the outer chamber 2d, formed by the secondary shielding of reactor 1, is about 200 standard cubic feet per minute, as previously stated, so that the replacement stream has a flow rate of about 10 percent of the rated capacity of the unit. This mixture of liquid and vapor passes from the junction 41 into the passage 6b of the heat-exchanger 6 at a temperature of approximately —300° F., emerging at a temperature of, say, +75° F., having refrigerated the counter-flowing stream in column 6a. Heat exchanger 6, which may assume any of the forms well-known in the art, is preferably of stainless steel. Alternatively, aluminum can be used for this purpose if the structure is bottled after use, inasmuch as there is a remote possibility of the aluminum becoming radioactive.

Assuming that the heat-exchanger 6 has been refrigerated to the desired degree by the passage of liquid nitrogen, valve 46 is closed and valve 47 is opened, so that nitrogen gas which has been raised to a temperature of, say, about 75° F., passes from the junction 45 to the junction 48, where it is joined by a stream of nitrogen returning from flow through the system at the rate of 180 standard cubic feet per minute. This combined flow, at the rate of 200 standard cubic feet per minute, at ambient temperature and a pressure of about 16 pounds per square inch absolute, is passed through the centrifugal blower 44.

Centrifugal blower 44 operates to impel the stream of inert gas into the outer chamber 2d surrounding reactor core 1, raising the pressure about 2 pounds per square inch, thereby supplying sufficient driving force to overcome friction in the conduits. Accordingly, the stream of gas picks up radioactive contaminants, including xenon and krypton and steam escaping from containment shell 2b, in the chamber 2d which is operated at several inches of water pressure. A second centrifugal blower 3 removes the nitgrogen gas containing the radioactive contaminants from the chamber 2d, into pipe 4, raising the pressure to 30 pounds per square inch absolute.

The power for driving the centrifugal pumps 3 and 44 is derived from emergency electrical generator 100. These pumps are of types well-known in the art which are suitably enclosed in boxes having a positive nitrogen pressure to prevent leakage of the radioactive gases to atmosphere. In case of an accident releasing an excess quantity of fission products, this is operable manually, or is triggered automatically under control of suitable detecting means 101 which may take the form, for example, of a conventional counter set to operate an electrical switch 102 at a preselected level of radioactivity within the chamber 2d. Switch 102, of an ordinary solenoid type, turns on the generator 100, which is designed to generate power in any well-known manner, such as, for example, by the combustion of natural gas or propane.

The stream of gas bearing the contaminants passes from blower 3 into the valve 5a which is set in open position, and into the passage 6a of the heat-exchanger 6, previously described. The valves 5a, 5b, 5c, and 5d are conventional types which are designed for remote operation by either pneumatic or electrical means. It will be noted that the system comprising valves 5a, 5b, 5c, and 5d is arranged so that if the operation of each valve is reversed, the flow of gas through the system will be reversed.

In the heat-exchanger 6, the contaminated gas stream is cooled down from approximately +80 to −120° F. by counterflow with liquid nitrogen or cold gaseous nitrogen, or a combination of the two, from the storage tank 35, the primary purpose of this heat exchange being to freeze out water vapor and other impurities on the walls of the heat-exchanger so that they will not solidify and plug up the system. Moreover, it is important to eliminate water from the nitrogen carrier gas stream, since water does not mix well with the fluorocarbon solvent, preferred for the purposes of the present invention for use in dissolving the radioactive noble gases, krypton and xenon, from the carrier stream in a manner to be described presently.

The effluent contaminated carrier from the passage 6a of heat-exchanger 6 flows to passage 8a of heat-exchanger 8, where it is again heated up from −120° F. to a temperature of about 40° F. by counter-flow with the returning nitrogen stream in passage 8b. Heat-exchanger 8 is generally similar in form to the previously described heat-exchanger 6, except for the fact that it has only two channels instead of three, in the latter.

The gas stream from passage 8a flows through the solvent-collecting chamber 10. Chambers 10 and 24 take the form of centrifugal separators.

Centrifugal separators 10 and 24 are designed for unilateral operation only, so that they merely by-pass the incoming stream of nitrogen, bearing contaminants, to the solvent bath, and are operative only in a reverse direction to separate solvent vapors from the returning nitrogen stream. It will be apparent from the arrangement of valves and other apparatus in the circuit under description, that the system is completely reversible.

From the chamber 10, the nitrogen stream flows through the open valve 12a of the system of check-valves 12. The latter are of any standard make suitable for cryogenic service, such as used, for example, in refrigeration systems. Each valve is constructed to be unilaterally operative, 12a and 12c opening only for flow in the direction of the solvent bath, and 12b and 12d opening only for flow in an opposite direction. As in the case of valve system 5a, 5b, 5c, 5d, these valves also are arranged to accommodate a reversal of nitrogen flow in the system being dependent on the closed or open positions of valves 5a, 5b, 5c and 5d. They may be constructed of any materials suitable for low-temperature operation, such as, 9% nickel-steel, stainless steel, copper, or aluminum.

From valve 12a, the gas stream flows into the dome of tank 14 and through sparger 16, which is disposed in the solvent bath 15 contained in the tank. The tank 14 is a conventional type constructed of non-ferrous material suitable for cryogenic use, such as aluminum, copper, or non-magnetic stainless steel. In the present illustrative embodiment, tank 14 has dimensions of 2 feet in diameter and 5 feet in depth; and for present purposes, is filled with 50 gallons of solvent, to a level of, say, 30 inches.

In the present illustrative embodiment, the solvent bath 15 comprises a fluorocarbon known as trichlorofluoromethane, $CCl_3F$, which is sold under the trade name "Freon 11." Alternative solvents which have been found to be useful for the purposes of the present invention include several other fluorocarbons, such as dichloromonofluoromethane, known by the trade name "Freon 21," and dichlorotetrafluoroethane, $CClF_2$—$CClF_2$, known by the trade name "Freon 114." Each of the above-named solvents has an affinity for the radioactive contaminants, xenon and krypton, which substantially exceeds that of the inert carrier gas, nitrogen; and additionally, they are characterized by freezing temperature within the range −137 to −211° F., and boiling points within the range 38.4° F. to 74.8° F. Important considerations in the selection of a solvent for the purposes of the present invention, in addition to its high affinity for xenon and krypton compared to that of the carrier gas, are as follows:

(1) that it have a relatively low saturation vapor-pressure under the conditions of the bath, which in the present embodiment is maintained at approximately +40° F. at 30 pounds per square inch absolute to maximize the solubility therein of krypton and xenon; and (2) that it have a substantially higher freezing point than that of the carrier gas, or the radioactive contaminants, krypton and xenon, so that any vaporized solvent which tends to flow out of the bath with the returning stream of carrier gas can be frozen out in the heat exchanger 8.

The sparger 16 which is disposed to a depth of say 1.5 feet in the bath 15, comprises, in preferred form, an aspirator type consisting of a tube formed from any non-ferrous metal suitable for cryogenic application, such as copper, 9 percent nickel-steel, nonmagnetic stainless steel, or aluminum treated to minimize radioactivity. In preferred form, the tube has an inner diameter of 2 inches, and an outer diameter of 2¼ inches. The lateral wall of the tube is provided with a plurality of perforations, say ⅛ of an inch in cross section, and spaced ⅜ of an inch apart, the total area of holes being equivalent to 3.5 square inches. These perforations should be large enough to minimize plugging of the sparger by foreign entrained particles such as scale, dirt, etc. The sparger 16 should have the hole areas immersed at a sufficient depth of liquid to provide contact time between the carrier gas containing the noble gases and the absorbent. The velocity of the gas through the liquid should be, say, of the order of 2 feet per second.

Interposed in the solvent bath 15 is a cooling system consisting of a coil of pipes 17 connected to an auxiliary refrigeration system 17a which utilizes any suitable refrigerant, such as nitrogen vapor, or monochlorodifluoromethane ($CHClF_2$), known as "Freon 22," which is a registered trade name of E. I. du Pont de Nemours and Company. This refrigerant maintains the bath 15 at a temperature of about +40° F., at a pressure of 30 pounds per square inch absolute, at which point solubility for radioactive xenon is maximum for normal operating pressures and temperatures.

At the base of the tank 14 is an outlet pipe and remotely operated valve 18 of any of the forms suitable for operation at +30° F. to +40° F. temperatures. This may be operated manually, or alternatively, pneumatically, under control of any conventional electrical relay system, to release batches of solvent 15, characterized as "Freon 11," containing the dissolved radioactive krypton and xenon contaminants for possible recovery, or offshore dumping into the sea. This may be accomplished, for example, by bringing up an auxiliary tank 18a to receive the measured batch of contaminated solvent, which is sealed up for disposal in the sea or elsewhere. The auxiliary tank 18a is preferably in the form of a shielded lead cylinder, several of which can be employed for the purpose of removing the contaminated solvent.

As each measured batch is drained off through the valve 18, the level of the bath 15 is maintained constant by means of a system comprising a source 9 of solvent 15 at sufficient elevation or pressure to feed tank 14. In the present example the solvent is "Freon 11," the source of which is connected to tank 14 through the valve 21. This may be, for example, a solenoid-pneumatic piston type valve. The valve 21 is arranged to be in normally closed position, and to open in response to a signal from liquid-level control circuit 11, which would occur whenever the bath 15 drops below a pre-selected level. Liquid-level control circuit 11 may assume any type well known in the art. The electrical output from the liquid level indicating circuit 11 drives a servo system 20 which controls valve 21.

Upon operation of the valve 21, the solvent 15, which may comprise "Freon 11," passes out of the solvent supply tank 9 through the valve 21, which is of a type similar to that described hereinbefore with reference to valve 38. The gas from tank 14 then passes through the normally open valve 12d in the system of check valves 12, and into the conventional centrifugal separator 24 which functions to remove amounts of solvent which have infiltrated into the nitrogen stream, the liquid solvent being returned to the tank 14 through valve 25. Valves 25 and 26, which are conventional types used for cryogenic purposes, are designed to be alternately open or closed, depending on which way the nitrogen stream flows through the system. Thus, when the direction of operation of the valve system 5a, 5b, 5c, 5d, and check valve system 12 are reversed, reversing the direction of flow of the nitrogen stream, valve 26 is opened and valve 25 is closed.

After emerging from the centrifugal collector 24, the purified nitrogen stream passes through the channel 8b of the heat exchanger 8, where it cools down from approximately 40° F. to −110° F., giving up heat to the oncoming stream. At this point any remaining traces of the "Freon 11," or others of the disclosed solvents, are removed by being frozen out on the walls of heat exchanger 8. Thus, almost no solvent is lost in passing through the system.

Upon reversal of the flow in the exchanger 8, the deposited or frozen Freon is evaporated and deposited in container 14. After channel 8b, the stream then passes into channel 6c of heat exchanger 6, where it is warmed up from −110° F. to a little above room temperature, about 75° F., and passes out through the open valve 5c previously described. This assumes, of course, that valves 5b and 5d are closed, since these would only be opened in case it were desired to reverse the nitrogen flow in the system.

The stream of nitrogen, before returning to the chamber 2d formed by the secondary shielding of the reactor cell 1, passes through a chamber 43 which removes the excess water contained. The nitrogen stream is finally impelled into chamber 2d by centrifugal blower 44, previously described, which raises the pressure from about 25 to about 26 pounds per square inch absolute, for recirculation.

Let us refer now to FIGURE 3 of the drawings which shows an alternative embodiment of the invention in which a separation column serves the function of the liquid bath in the embodiment of FIGURE 2, by stripping the contaminants from the nitrogen carrier stream. As in the system of FIGURE 2, nitrogen or other inert carrier gas is supplied to the system under description from a storage tank 87, which holds, say, 200 gallons and which is of similar insulated construction to tank 35. As in the previously described system, the interior of tank 87 is maintained at a pressure of about 50 pounds per square inch absolute, and a temperature of about −300° F., depending on the subcooling of the liquid.

Pressure within the storage tank 87 is controlled, as in the previously described embodiment, by a pressure switch 88 similar to switch 39, the pressure sensing signal being transmitted to valve 89 at the bottom of tank 87. The pressure sensing means may comprise, for example, a diaphragm, bellows, or solenoid, connected to a conventional lever system which is tripped at a preselected pressure within tank 87. As in the previously described system, the lever system operates a miniature electrical switch 88, which cuts off the power supply to the solenoid valve 89, which corresponds to valve 38 in FIGURE 1.

The valve 90 which controls the flow of liquid nitrogen at about −300° F. at a pressure of 45 to 50 pounds per square inch absolute and flow rate of 35 standard cubic feet per minute, is operated by a liquid level indicator 50 of any of the types well known in the art. The latter is mounted in the reflux condenser 71, which comprises an outer chamber 71a, containing a liquid nitrogen bath, maintaining a level such that sufficient reflux is condensed in coil 70, the inlet of which enters laterally near the top end of the condenser 71, and which has an outlet from the bottom thereof, the lower half of the coil being disposed in the liquid nitrogen bath. Vessel 71a of condenser 71 has an outlet 80 from its dome for effluent nitrogen vapor, which is produced upon condensation of liquid in the coil 70.

Cold nitrogen vapor, at a temperature of about −300° F., a pressure of 17 pounds per square inch absolute, and a rate of flow of, say, 35 standard cubic feet per minute, passes out of reflux condenser 71 through the outlet 80 in its dome, and flows to the junction 94, where it separates into two streams. One stream, comprising about 57 percent of the flow, passes through the channel 59c of the heat exchanger 59, of a conventional type, as previously described, where it is warmed up from about −300° F. to −110° F., through the conventional cryogenic valve 96, and through heat exchanger 57, where it is warmed up from −110° to +75° F., in each heat exchanger absorbing heat from counterflowing fluids. The stream is finally vented to the atmosphere through valve 97. Valves 91, 93, 96, and 97 make it possible to direct more cold gas to chamber 59c or 57c in heat exchangers 59 and 57, respectively, or any combination thereof. The cold-end temperature difference at 82a and 82b can be controlled by valves 96 and 91. The warm-end temperature difference of heat exchanger 57 at 86a and 86b can be controlled by valves 93 and 97.

To replenish the nitrogen dissipated in the system, and to keep the stream flowing through the system at the proper volume and temperature, a second stream of vapor, which under ordinary operating conditions has a flow of about 15 standard cubic feet per minute, passes from junction 94 through the standard cryogenic valve 91 and second standard valve 93 into junction 92 where it is combined with the carrier stream of nitrogen returning through the system. The combined stream passes into the outer low pressure chamber 2d of the nuclear reactor 1, through compressor 98, which is a conventional type of centrifugal pump or blower, such as described with reference to the previous system, and which is completely enclosed in shielding to prevent the escape of gas to the atmosphere, and which raises the pressure of the incoming gas stream from 14.7 to about 17 pounds per square inch absolute.

As in the previously described embodiment, the compressors 98 and 51 are driven by an emergency source of power 200, the operation of which is triggered by a device 201, such as a conventional counter, which is sensitive to a predetermined level of radioactivity in the outer chamber 2d and core of cell 1, which in the example under description is set to respond when the radioactivity reaches an unsafe level as defined by the standards set by The Atomic Energy Commission. As in the previously described system, this actuates a servo 202 to drive power source 200.

The nitrogen stream is pumped through the outer chamber 2d of the reactor shell 2b, at the rate of, say, 200 standard cubic feet per minute, flushing steam and radioactive contaminants out of that chamber into compressor 51, where the pressure is raised to about 45 pounds per square inch absolute.

The function of the after-cooler 52, which is merely a coil containing water flowing at room temperature disposed in the pipe through which the contaminated stream of gas is flowing, is to remove the heat of compression generated by compressor 52, cooling the gas down from about 300° F. to 80° F. Valve 53, normally closed, is a safety device designed to prevent a build-up of pressure in the system. This is vented back to the outer chamber 2d of the nuclear reactor.

The contaminated stream next flows through the system of valves 55a, b, c, and d, which are of types as previously described, valves a and d being normally open, and b and c being normally closed, for flow in the direction of the arrows. For a reversal of flow in the stream, the condition of the valves is reversed. The time cycle is about 15 minutes per half cycle since water is the only contaminant to be removed in the exchanger system by freeze-out as water-ice. In air separation plants this is about 7½ minutes due to the presence of $CO_2$.

The contaminated nitrogen stream then passes to channel 57a of the heat-exchanger 57, which is one of the types previously described, where it is cooled down from a temperature of about +80° F. to about —115° F.; and subsequently, to channel 59a of a second heat exchanger 59, of a similar type, where it is cooled from about —115° F. to about —290° F. From the last-named heat exchanger, the cooled stream passes through the normally open check valve 61a of the check valve system 61a, b, c, and d. The latter is similar to the valve system 22 described with reference to the embodiment of FIGURE 1. Valves a and d are normally open; and b and c normally closed, unless the direction of flow through the system is reversed, in which case valves a and d are closed and b and c are opened.

From the valve 61a, the stream of gas is introduced into the separation column 64 through the inlet 62, just above the 10th contact plate above the base of the column 64. The stream flowing into inlet point 62 at the rate of, say, 200 standard cubic feet per minute, has temperature and pressure of about —290° F. and 35 pounds per square inch absolute, respectively.

The separation column 64 may assume any of the forms well known in the art. It may be constructed of any of the metals suitable for cryogenic use, such as nonmagnetic stainless steel, copper, aluminum, or 9 percent nickel-steel. For the purposes of the present embodiment, column 64 is about 6 feet high and 2 feet in diameter in the upper portion, having a dome shaped top 67. At the base of the column is a bulb shaped container 84 about 1 foot high, and having a maximum diameter of 4 inches. The principal cylindrical portion of the column 64 contains 10 perforated contact plates in the upper section of large cross section and 10 perforated contact plates about 4 inches in diameter in the lower section of smaller cross section. Nitrogen, which has been condensed to liquid in the reflux condenser 71 flows through an inlet 72 in the dome 67 at the rate of about 30 standard cubic feet per minute, and dribbles down through the contact plates in column 64. The pressure in column 64 varies from about 34 pounds per square inch absolute at the top to about 36 at the bottom, being about 35 at inlet point 62. The liquid dribbling down through the plates passes through rising vapor, from which it strips impurities, including radioactive krypton and xenon, which in the case of the maximum credible accident would be present in amounts up to 800 grams, or 7 standard cubic feet, of krypton-xenon mixture flowing in through inlet 62. The contaminants become more highly concentrated in the liquid nitrogen bath 66 at the base of column 64 where they are stripped out and concentrated, and removed through the outlet 85 for disposal in a shielded container 85a. The liquid-to-vapor ratio in the upper section of column 64 is 1.5 to 10, and in the lower section about one-to-one, so that the nitrogen gas rising up through the column and flowing out through vent 83 in the dome 67 is about 99.995 percent pure.

The liquid in the bottom of container 84 in which the liquid xenon and krypton have been separated out, will also contain oxygen which was infiltrated into the original system as air in the chamber 2d. This liquid is led off from a tap 73 in the bottom of bulb 84, and through the flash vaporizer 75 which is of a conventional type. The latter serves to convert the liquid comprising oxygen, nitrogen, argon, krypton, and xenon at about —284% F. to vapor at a temperature of —220° F. This stream of vapor then passes through the channel 42a of heat exchanger 42 where it is heated up from about —220° F. to about —60° F., and through channel 76a of heat exchanger 76, where it is further heated to about +600° F. by heat exchange with the outgoing stream from the catalytic oxidizer 56. The heat exchangers are similar to the types previously described. The stream is then introduced into a heating chamber 58, where it is heated up from about 600° F. to about 850° F. The heater in chamber 58 may be any conventional type, employing for example, a high resistance coil of nichrome or the like.

At a temperature of 850° F., the nitrogen stream is introduced into the catalytic oxidizing chamber 56. It may be equipped with a liner of Pyrex or the like, or inconel tube, a heating jacket and compression closure. The liner of chamber 56 is charged with pellets of a suitable catalyst comprising for example, platinum. The chamber is maintained at about 850° F. and a pressure of about 34 pounds per square inch absolute, during the reaction, in which hydrocarbon impurities in the oxygen containing stream, such as methane $CH_4$, and acetylene $C_2H_2$, are converted into carbon dioxide and water in the presence of the catalyst. The stream sustains a heat loss from 850° F. to about 750° F. in the catalytic chamber 56, and sustains a further heat loss from about 750° F. to about 40° F. to the incoming stream by passing through channel 76b of the heat exchanger 76. At this point the stream enters the drying chamber 78. The latter, which may be a cylindrical chamber having a diameter of 4 inches and 12 inches long, is charged with pellets or powders of materials known to be adsorbtive of water and carbon dioxide, such as for example, the zeolites, a family of minerals consisting of hydrated silicates of aluminum with alkalis or alkaline earths, or both, known as molecular sieves.

After passing through the drying chamber 78, the gaseous stream is cooled down to about —170° F. by passing through channel 42b of heat exchanger 42. It then passes through the valve 79, of a type suitable to function in cryogenic systems, which is regulated by a conventional type of fluid flowmeter 79a, adapted for use with cryogenic fluids. The electrical output from flowmeter 79a may be utilized to drive a conventional relay which controls the opening or closing of valve 79 to maintain the warm flow into the column 64 at a point just above bulb 84, at the rate of say 15 standard cubic feet per minute. In order to provide sufficient head to force the fluid through the auxiliary catalytic circuit including catalytic oxidizer 56, bulb 84 should be disposed in a position which is high relative to the components of the latter circuit.

The nitrogen vapor undergoing purification rises up through the perforated plates of column 64, as previously described, and flows out through egress pipe 83 in the dome 67 at the rate of about 230 standard cubic feet per minute to the junction point 68, where it flows at the rate of about 30 standard cubic feet per minute into the coil 70 of reflux condenser 71 where it is again condensed to liquid by a heat exchange with evaporating liquid nitrogen in the outer chamber. The remaining vapor stream flows at the rate of about 200 standard cubic feet per minute from junction 68 through the valve 81, of any type suitable for cryogenic service, which maintains a back pressure on the system of column 64, and through the normally open check valve 61d of the previously described check valve system 61, where it passes into channel 59b of heat exchanger 59. In the latter heat exchanger it is heated up from about −295° F. to about −105° F. It then passes into channel 57b of heat exchanger 57 where the temperature is further raised from −105° F. to 75° F. and removes deposited frozen water from the exchanger surface from the previous cycle. From channel 57b the cleansed nitrogen stream passes through the normally open valve 55d of the previously described valve system 55, and through the junction 92, where it is combined with cold vapor flowing at a rate of about one to two standard cubic feet per minute, forming a combined stream flowing at a rate of, say 200+ standard cubic feet per minute, at about room temperature and a pressure of about 14.5 pounds per square inch absolute, which flows through the centrifugal compressor 98 where the pressure is raised to, say 17 pounds per square inch absolute, and back to chamber 2d of the reactor cell 1 for a return trip through the system.

It will be apparent to those skilled in the art that the scope of the present invention is not confined to the particular apparatus or combination of apparatus, or to any precise temperatures, particular pressure flow rates, or any agents described specifically herein by way of illustration but that rather, the scope of the present invention is defined in the appended claims.

I claim:

1. In combination with a nuclear reactor comprising a core contained in a pressure vessel surrounded by shielding means forming a chamber, means to force air into said chamber during normal operation of said reactor to remove radioactive contaminants therefrom, further means to direct said air to the atmosphere after its exhaust from said chamber, detecting means to sense the concentrations of radioactive contaminants in said air, means comprising a closed conduit system to introduce an inert gas into said chamber to remove said contaminants from said chamber, said detecting means triggering said means for introducing inert gas when a predetermined level of contaminants has been sensed by said detecting means and means included in said system for removing said contaminants from said inert gas.

2. The reactor as recited in claim 1 in which said contaminant removing means comprises a solvent bath.

3. The reactor as recited in claim 1 in which said contaminant removing means comprises a rectification column.

4. The reactor as recited in claim 2 in which control means are provided for maintaining a desired level of solvent in said solvent bath.

5. The reactor as recited in claim 2 including means for introducing the inert gas into the solvent bath and further means for removing solvent which infiltrated into the inert gas in the system.

6. In combination with a nuclear reactor comprising a core surrounded by primary shielding disposed inside of a containment vessel, and secondary shielding substantially impervious to radiation from said core disposed outside said containment vessel and forming therewith a closed outer chamber, an auxiliary chamber also enveloped in shielding substantially impervious to radiations from said core connected to and communicating with said outer chamber, said auxiliary chamber housing a safety mechanism for removing impurities including radioactive contaminants comprising xenon from said outer chamber, said safety mechanism comprising in combination: a source of an inert carrier gas comprising a substantial proportion of nitrogen having an affinity for said impurities including said radioactive contaminants, a circuit of closed conduits connected to said source and said outer chamber, means comprising a system of pumps for causing a stream of said inert carrier gas from said source to circulate in said closed conduit system and in said outer chamber for flushing said impurities including said radioactive contaminants from said inert carrier gas for ultimate disposal, said means including a solvent bath comprising a substantial proportion of a fluorocarbon having a boiling point approximately within the range 30° F. to 80° F., and a freezing point approximately within the range −130° F. to −211° F., and means for purifying and returning said inert carrier gas for recirculation in said conduit system.

7. The combination in accordance with claim 6 wherein said solvent bath comprises in substantial proportion trichlorofluoromethane.

8. The combination in accordance with claim 6 which comprises in combination with said solvent bath an auxiliary refrigeration system for maintaining said bath at a temperature within a temperature range at which said bath exhibits a maximum solubility for xenon under the pressure environment of said bath.

9. In combination with a nuclear reactor comprising a core surrounded by primary shielding disposed inside of a containment vessel, and secondary shielding substantially impervious to radiation from said core disposed outside said containment vessel and forming therewith a closed outer chamber, an auxiliary chamber also enveloped in shielding substantially impervious to radiation from said core connected to and communicating with said outer chamber, said auxiliary chamber housing a safety mechanism for removing impurities including radioactive contaminants from said outer chamber, said safety mechanism comprising in combination: a source of an inert carrier gas having an affinity for said impurities including said radioactive contaminants, a circuit of closed conduits connected to said source and said outer chamber, means comprising a system of pumps for causing a stream of said inert carrier gas from said source to circulate in said closed conduit system and in said outer chamber for flushing said impurities including said radioactive contaminants out of said chamber and into said closed system, means included in said closed system for removing said impurities including said radioactive contaminants from said inert carrier gas for ultimate disposal, said means comprising a rectification column for stripping impurities including said contaminants from said inert carrier gas and concentrating said radioactive contaminants for ultimate disposal, wherein said impurities in said inert carrier gas include a proportion of oxygen and hydrocarbon compounds, auxiliary circuit means connected to said rectification column comprising a catalytic combustion chamber for converting said oxygen and hydrocarbons to carbon dioxide and water, means for absorbing said carbon dioxide and water, and means for purifying and returning said inert carrier gas for recirculation in said conduit system.

10. A safety mechanism for removing impurities including radioactive xenon and krypton from the environment of an atomic reactor, which comprises in combination a closed radiation shielded outer chamber surrounding said reactor, a source of an inert carrier gas comprising a substantial proportion of nitrogen, a closed radiation shielded conduit system communicating with said outer chamber, pumping means for causing said inert carrier gas to circulate in said outer chamber and said conduit system including heat exchanger means for freezing out impurities including water vapor from said carrier gas, means for removing said impurities including said radioactive xenon and krypton from said carrier gas, said means comprising a bath of solvent connected to said closed conduit system, said solvent containing a substantial proportion of a fluorocarbon having a boiling point approximately within the range 30° F. to 80° F. and having a freezing point approximately within the range −130° F. to −211° F., means for periodically removing batches of said solvent including said radioactive xenon and krypton for ultimate vessel, and means for returning said carrier gas after purification through said closed system for reuse.

11. The combination in accordance with claim 10 wherein said solvent contains a substantial proportion of trichlorofluoromethane.

12. A safety mechanism for removing impurities including radioactive xenon and krypton from the environment of an atomic reactor, which comprises in combination a closed radiation shielded outer chamber surrounding said reactor, a source of an inert carrier gas including a proportion of oxygen and hydrocarbon compounds, a closed radiation shielded conduit system communicating with said outer chamber, pumping means for causing said inert carrier gas to circulate in said outer chamber and said conduit system flushing said impurities including said radioactive xenon and krypton from said outer chamber, said conduit system including heat exchanger means for freezing out impurities including water vapor from said carrier gas, means for removing said impurities including said radioactive xenon and krypton from said carrier gas for ultimate disposal thereof, said means including a rectification column connected to said closed conduit system, an auxiliary circuit means connected to said rectification column comprising a catalytic oxidizing chamber for converting said oxygen and hydrocarbon compounds to carbon dioxide and water, means for absorbing said carbon dioxide and water, and means for returning said carrier gas after purification through said closed system for reuse.

13. The method of removing impurities including radioactive materials escaping from the core of a nuclear reactor which comprises the steps of circulating an inert carrier gas in a shielded outer chamber surrounding the core of said reactor, thereby to purge said impurities including said radioactive materials from said chamber, passing said inert carrier gas comprising said impurities including said radioactive materials through a closed radiation shielded circuit including a system of heat exchangers for reducing the temperature of said gas and its contents to below the freezing point of water whereby water included in said impurities freezes out on the walls of said heat exchangers, separating said impurities including said radioactive materials from said inert carrier gas by passing said inert carrier gas through a bath comprising a solvent having an affinity for said radioactive materials which exceeds that of said inert carrier gas, recirculating said inert carrier gas after said separation through said closed shielded circuit including said heat exchangers wherein the temperature of said recirculating carrier gas is reduced at one point in its cycle to below the freezing point of said solvent whereby to freeze any residue of said solvent out of said recirculating carrier gas, passing said recirculating carrier gas from said heat exchangers to said shielded outer chamber surrounding said core for picking up additional impurities including radioactive materials, and removing said radioactive materials in a shielded environment for ultimate disposal.

14. The method of removing impurities including radioactive materials escaping from the core of a nuclear reactor which comprises the steps of circulating an inert carrier gas in a shielded outer chamber surrounding the core of said reactor, thereby to purge said impurities including said radioactive materials from said chamber, passing said inert carrier gas comprising said impurities including said radioactive materials through a closed radiation shielded circuit including a system of heat exchangers for reducing the temperature of said gas and its contents to below the freezing point of water whereby water included in said impurities freezes out on the walls of said heat exchangers, separating said impurities including said radioactive materials from said inert carrier gas, wherein said separation step is carried out by passing said inert carrier gas including said impurities through a rectification column wherein said inert gas is stripped of said impurities and passes out of the top of said column, and said impurities including said radioactive materials are concentrated in the bottom of said column, and wherein impurities including oxygen and hydrocarbons are removed from said inert carrier gas prior to recycling by the steps of passing a portion of the liquid from the bottom of said column through a catalytic combustion chamber for removing said oxygen and hydrocarbons through the production of carbon dioxide and water, and removing said carbon dioxide and water, recirculating said inert carrier gas after said separation through said closed shielded circuit including said heat exchangers to said shielded outer chamber surrounding said core for picking up additional impurities including radioactive materials, and removing said radioactive materials in a shielded environment for ultimate disposal.

15. A safety mechanism for removing impurities including radioactive xenon and krypton from the environment of an atomic reactor, which comprises in combination a closed radiation-shielded outer chamber surrounding said reactor, a source of an inert carrier gas, a closed radiation-shielded conduit system communicating with said outer chamber, pumping means for causing said inert carrier gas to circulate in said outer chamber and said conduit system flushing said impurities including said radioactive xenon and krypton from said outer chamber, said conduit system including heat exchanger means for freezing out impurities including water vapor from said carrier gas, means for removing said impurities including said radioactive xenon and krypton from said carrier gas for ultimate disposal thereof comprising a bath of solvent connected to said closed conduit system and having a higher affinity for said impurities including said radioactive xenon and krypton than that of said carrier gas, and means for periodically removing batches of said solvent including said radioactive xenon and krypton for ultimate disposal, and means for returning said carrier gas after purification through said closed system for reuse.

16. The method of removing impurities including radioactive materials escaping from the core of a nuclear reactor which comprises the steps of circulating an inert carrier gas in a shielded outer chamber surrounding the core of said reactor, thereby to purge said impurities including said radioactive materials from said chamber, passing said inert carrier gas comprising said impurities including said radioactive materials through a closed radiation-shielded circuit including a system of heat exchangers for reducing the temperature of said gas and its contents to below the freezing point of water whereby water included in said impurities freezes out on the walls of said heat exchangers, separating said impurities including said radioactive materials from said inert carrier gas by passing said inert carrier gas through a bath comprising a solvent having an affinity for said radioactive materials which exceeds that of said inert carrier gas, recirculating said inert carrier gas after said separation through said closed shielded circuit including said heat exchangers to said shielded outer chamber surrounding said core for picking up additional impurities including radioactive materials, and removing said radioactive materials in a shielded environment for ultimate disposal.

17. The method in accordance with claim 16 wherein said bath is maintained at a temperature at which the affinity of said solvent for at least a portion of said radioactive materials is substantially at a maximum.

References Cited

UNITED STATES PATENTS

| | | | |
|---|---|---|---|
| 2,284,662 | 6/1942 | Kahle | 55—66 X |
| 3,115,450 | 12/1963 | Schanz | 176—37 |
| 3,155,595 | 11/1964 | Schluderberg | 176—20 |
| 3,158,546 | 11/1964 | Cordova | 176—37 |
| 3,203,866 | 8/1965 | Lehmer et al. | 176—37 |
| 3,232,843 | 2/1966 | Went et al. | 176—37 |

OTHER REFERENCES

Nucleonics, February 1963; (vol. 21, No. 2) pp. 17 and 18.

Nuclear Safety, vol. I, No. 4 (June 1960), pp. 47 to 56.

REUBEN EPSTEIN, *Primary Examiner.*